United States Patent
Visser

(10) Patent No.: US 6,870,405 B2
(45) Date of Patent: Mar. 22, 2005

(54) METHOD FOR DRIVING AN INSULATED GATE SEMICONDUCTOR DEVICE USING A SHORT DURATION PULSE

(75) Inventor: Barend Visser, Potchefstroom (ZA)

(73) Assignee: Potchefstroom University For Christian Higher Education (ZA)

( * ) Notice: Subject to any disclaimer, the term of this patent is extended or adjusted under 35 U.S.C. 154(b) by 0 days.

(21) Appl. No.: 10/226,099

(22) Filed: Aug. 22, 2002

(65) Prior Publication Data

US 2003/0122608 A1 Jul. 3, 2003

Related U.S. Application Data

(63) Continuation-in-part of application No. 09/914,199, filed as application No. PCT/ZA00/00031 on Feb. 24, 2000, and a continuation-in-part of application No. PCT/ZA01/00024, filed on Feb. 23, 2001.

(51) Int. Cl.⁷ .................................................. H03K 3/00
(52) U.S. Cl. ........................................ 327/108; 327/170
(58) Field of Search ....................... 327/108–112, 170, 327/374, 376

(56) References Cited

U.S. PATENT DOCUMENTS

| | | | |
|---|---|---|---|
| 3,883,413 A | 5/1975 | Douglas-Hamilton | 204/176 |
| 4,038,165 A | 7/1977 | Lowther | 204/176 |
| 4,471,245 A * | 9/1984 | Janutka | 327/376 |
| 4,491,807 A | 1/1985 | Hoover | 331/111 |
| 4,695,936 A | 9/1987 | Whittle | 363/21 |
| 4,713,220 A | 12/1987 | Huynh et al. | 422/186.16 |
| 4,736,121 A * | 4/1988 | Cini et al. | 327/376 |
| 4,764,857 A | 8/1988 | Konopka | 363/49 |
| 4,869,881 A | 9/1989 | Collins | 422/186.18 |
| 4,912,335 A | 3/1990 | Ehalt et al. | 250/551 |
| 5,140,201 A | 8/1992 | Uenishi | 307/571 |
| 5,475,333 A | 12/1995 | Kumagai | 327/530 |
| 5,504,449 A | 4/1996 | Prentice | 327/427 |

FOREIGN PATENT DOCUMENTS

| | | |
|---|---|---|
| DE | 196 33 368 | 2/1998 |
| SU | 941 276 | 7/1982 |

OTHER PUBLICATIONS

McGinty, "Designing With Low–Side MOSFET Drivers", Micrel, Inc., Application Note 24, Mar. 1998.
McGinty, Designing With Low–Side MOSFET Drivers, EDN Electrical Design News; Cahners Publishing Co., Newton, Massachusetts, vol. 43, No. 13, Jun. 18, 1998, pp. 4–5, XP–000832798.
XP–00238944, SU 941 276 B, Database WPI, Section Ch, Week 198320, Derwent Publications Ltd., London, GB.
Patent Abstracts of Japan, vol. 1997, No. 10, Oct. 31, 1997; JP 09156904 A Jun. 17, 1997.

* cited by examiner

Primary Examiner—Kenneth B. Wells
(74) Attorney, Agent, or Firm—Cantor Colburn LLP

(57) ABSTRACT

A circuit for driving a MOSFET (12) includes a capacitor (14) and a switch (16) connected to a gate (20) of the MOSFET. The circuit applies a charge pulse to the gate of the MOSFET so as to switch the MOSFET between one of an on state and an off state and the other of the one state and the off state. The duration of the pulse is such that the pulse is substantially complete prior to switching of the MOSFET. The pulse causes a voltage on the gate for a short period to be raised above a maximum gate-to-source rating of the MOSFET, thereby to improve the switching speed of the MOSFET.

17 Claims, 8 Drawing Sheets

METHOD FOR DRIVING AN INSULATED GATE SEMICONDUCTOR DEVICE USING A SHORT DURATION PULSE

This application is a continuation-in-part application of U.S. Ser. No. 09/914,199 of Barend Visser for "Method And Apparatus For producing Ozone", filed on Mar. 5, 2002 as a 371 of PCT/ZA00/00031, filed on Feb. 24, 2000; and International Application PCT/ZA01/00024, filed on Feb. 23, 2001, inventor Barend Visser, and entitled "Drive Circuit And Method For Mosfet".

TECHNICAL FIELD

This invention relates to a circuit and method for improving the switching speed of insulated gate semiconductor devices such as metal oxide field effect transistors (MOSFET's), more particularly power MOSFET's.

BACKGROUND OF THE INVENTION

Capacitance inherent in transistor junctions limits the speed at which a voltage within a circuit can switch. It is also well known that the Miller effect has an influence on the capacitance at the gate of devices of the aforementioned kind.

Prior art teaches a number of methods of alleviating the Miller effect in high frequency transistor switching circuits, for example by reducing source impedance or reducing feedback capacitance, or both.

Even with such improvements, an output of a MOSFET such as an IRF740 typically switches through 200 volts in a rise time of approximately 27 ns at a peak current of 10 amperes and in a fall time of approximately 24 ns. These times may be too long for many applications.

OBJECT OF THE INVENTION

Accordingly, it is an object of the present invention to provide a triggering circuit and method for improving the rise and/or fall times of insulated gate semiconductor devices with which the applicant believes the aforementioned disadvantages will at least be alleviated.

SUMMARY OF THE INVENTION

According to the invention there is provided a triggering circuit for an insulated gate semiconductor device comprising as a first terminal a gate and further comprising at least a second and a third terminal, the circuit comprising:
  a charge storage device and a fast switching means connected in a circuit to the gate of the device;
  the fast switching means being able to switch between an off and an on state in a first time period shorter than a specified turn-on delay time of the insulated gate device; and
  the fast switching means being controllable to move charge between the storage device and the gate of the insulated gate device, so that the insulated gate device switches between an off state and an on state in a second time period shorter than a specified rise time or fall time for the insulated gate device.

The insulated gate semiconductor device may be a metal oxide semiconductor field effect transistor (MOSFET), such as a power MOSFET.

Alternatively, the insulated gate semiconductor device may be an insulated gate bipolar transistor.

The first time period is preferably shorter than 2 ns.

The fast switching means may comprise one of: a SIDAC, a break-over diode, a bipolar transistor, another insulated gate semiconductor device and a high voltage fast switching device.

The specified turn-on time is typically a minimum turn-on time specified in a publicly available data sheet relating to the insulated gate semiconductor device.

The fast switching means may be electronically controllable.

The charge storage device may be a capacitor.

The insulated gate semiconductor device may switch from the off state to the on state as well as from the on state to the off state in periods shorter than specified rise and fall times respectively.

An inductor may be provided in the circuit between the fast switching means and the gate.

The triggering circuit may be integrated on a single chip.

The chip may further comprise additional circuitry also integrated thereon.

According to another aspect of the invention, a method of driving an insulated gate semiconductor device comprises the steps of:
  utilizing a fast switching means to transfer charge to a gate of the device;
  switching the fast switching means on in a first time period shorter than a specified turn-on delay time of the insulated gate device;
  moving charge to and from the gate to cause the insulated gate device to switch between an off and an on state in a second time period shorter than a specified rise time or fall time for the insulated gate device.

BRIEF DESCRIPTION OF THE DRAWINGS

The invention will now be described, by way of example only, with reference to the accompanying drawings wherein.

DESCRIPTION OF PREFERRED EMBODIMENTS OF THE INVENTION

Figure 1:
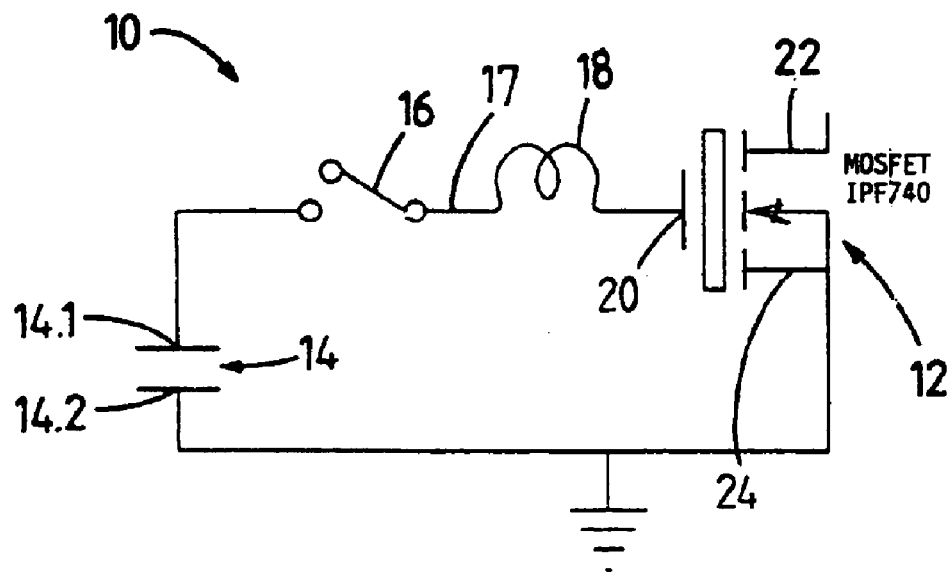
FIG. 1 is a basic circuit diagram of a triggering or driving circuit according to the invention for a MOSFET.

In FIG. 1, there is shown a basic diagram of a triggering circuit 10 according to the invention for an insulated gate semiconductor device 12 such as a metal oxide semiconductor field effect transistor (MOSFET).

In the diagram a power MOSFET is shown and which is available from International Rectifier under the trademark HEXFET number IRF740. A 10% to 90% rise time of an output voltage is specified in publicly available user data sheets of the device as being about 27 ns and a corresponding fall time is specified as being in the order of 24 ns. These times may be too long for some applications of the MOSFET. The turn-on delay time is specified at 14 ns and the turn-off delay time as 50 ns.

The triggering circuit 10 comprises a charge storage device in the form of a capacitor 14 having first and second terminals 14.1 and 14.2 respectively. The first terminal 14.1 is connected in a circuit 17 to a fast switching device 16. An optional inductor 18 is connected between the fast switching device 16 and a gate 20 of the MOSFET. The drain and source of the MOSFET are shown at 22 and 24 respectively.

The fast switching device 16 may be any suitable device having a switching speed faster than the data sheet specified turn-on delay time and/or turn-off delay time of the MOSFET, preferably better than 2 ns. Such devices may include a SIDAC, a break-over diode, a suitably configured bipolar transistor arrangement, or any other suitable fast switching device or circuit.

To switch the MOSFET on, the fast switching device is switched on electronically which rapidly transfers sufficient charge from the capacitor 14 to the gate 20 of the MOSFET, to switch the MOSFET on, i.e. to a desired state of conductivity in the drain source circuit of the MOSFET.

Figure 3:
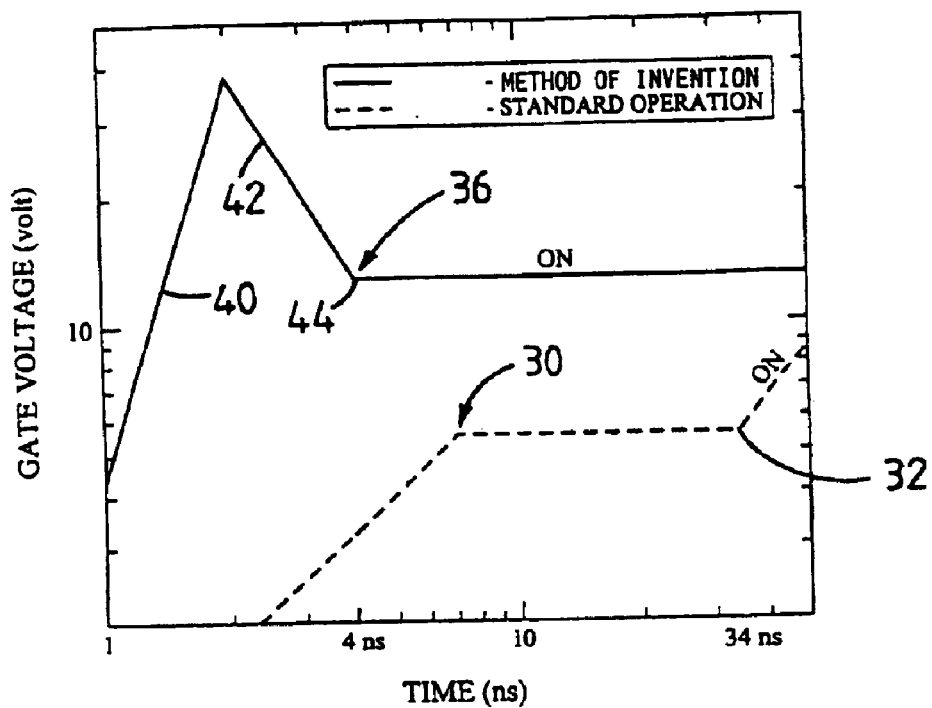
FIG. 3 includes a diagram in dotted lines of gate voltage against time of normal specified operation of the MOSFET and a diagram in solid lines of operation according to the method of the invention.
Figure 4:
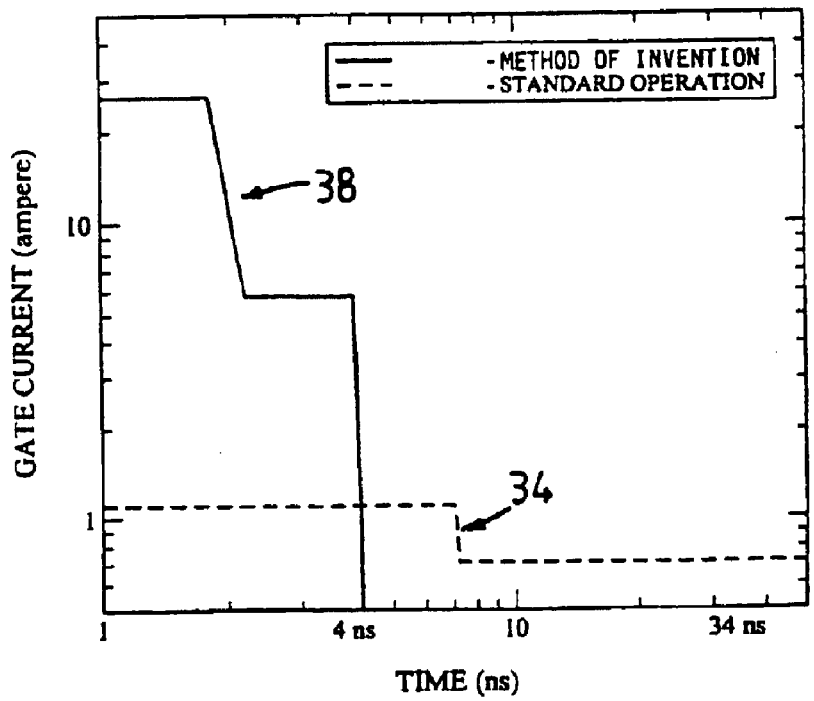
FIG. 4 includes a diagram in dotted lines of gate current against time of normal specified operation of the MOSFET and a diagram in solid lines of operation according to the method of the invention.

Time diagrams for the circuit in FIG. 1 are shown in FIGS. 3 and 4. The diagrams in broken lines indicate normal specified operation of the MOSFET 12. Hence, diagram 30 in FIG. 3 shows the gate voltage of the MOSFET during conventional switching on. The MOSFET is switched on at 32 and the diagram illustrates a turn-on delay time of about 34 ns. The associated gate current is shown at 34 in FIG. 4.

The diagrams for the method according to the invention are shown at 36 and 38 in FIGS. 3 and 4 respectively. At 40 in FIG. 3, the aforementioned rapid transfer of charge from capacitor 14 through switch 16 and consequent build up of voltage on the gate of the MOSFET are shown. The subsequent fall in the gate voltage shown at 42 is attributable to the aforementioned Miller effect. What is clear though is that the device switches on at 44, after a mere 4 ns. The associated current at the gate 20 is shown at 38 in FIG. 4. Initially, during the charge transfer stage, the gate current is high and thereafter it drops to a negligible level. It is also believed that with drain currents within the data specification of the MOSFET, switching losses with the switching method and circuit according to the invention are also reduced.

The value (C) of the capacitor 14, the voltage ($V_c$) required on the capacitor before switching and hence the breakthrough voltage of the switching device 16, the gate threshold voltage ($V_t$) of the MOSFET 12 and the gate charge ($Q_s$) required for complete switching of the MOSFET are related according to the following equation $$\frac{CVc}{(Qs/Vt+C)} > Vt.$$

Figure 2:
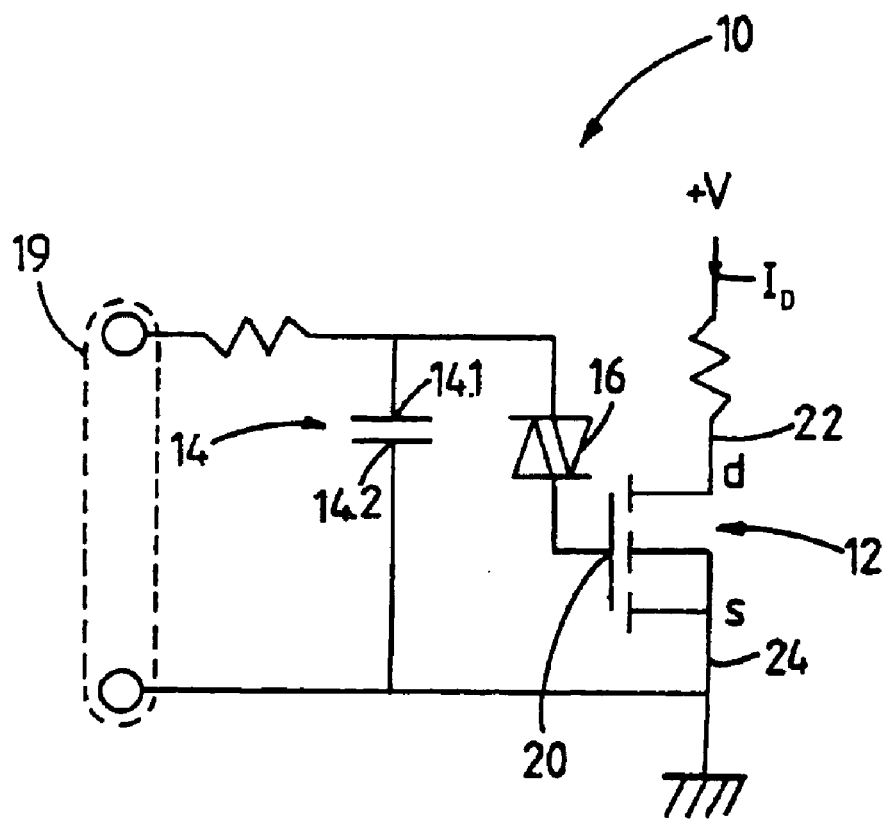
FIG. 2 is a diagram of one embodiment of the circuit comprising a SIDAC as fast switching device.

In FIG. 2 a circuit diagram of the triggering circuit 10 is shown wherein the first switching device 16 is a SIDAC.

A periodic voltage is applied across a capacitor 14, in parallel with a SIDAC 16 and a MOSFET 12. Initially, during a first half cycle, the voltage supplied at the input 19 is insufficient to switch the SIDAC 16 on and the capacitor 14 is hence charged up. When the supplied voltage reaches the threshold of the SIDAC 16 it switches on, resulting in a closed circuit from the capacitor 14 to the gate 20 of the MOSFET 12, partially discharging the capacitor 14 and hence charging the gate 20. The result is that a charge will now be shared between the capacitor 14 and the gate 20 and as clearly shown in FIG. 3, the voltage at the gate is briefly raised in the form of a pulse above the known maximum gate-to-source DC voltage rating of the MOSFET. Also as clearly shown in FIG. 3, the voltage is so raised before the MOSFET switches on at 44, when the gate voltage assumes a steady state value which is above the aforementioned known threshold voltage value of the MOSFET.

Hence as further clearly shown in FIG. 3, sufficient charge for a desired steady state gate voltage value is transferred to the gate, before the MOSFET switches on at 44.

Using this method, the gate voltage may for short intervals be driven approximately three to four times beyond the maximum rating of some MOSFET's 12, without destroying the device.

Similarly, for switching off, when the capacitor voltage exceeds the reverse threshold of the SIDAC 16 and current is conducted in the opposite direction, the gate voltage of the MOSFET 12 is for a short period driven beyond the aforementioned maximum rating, without destroying the device.

Figure 5:
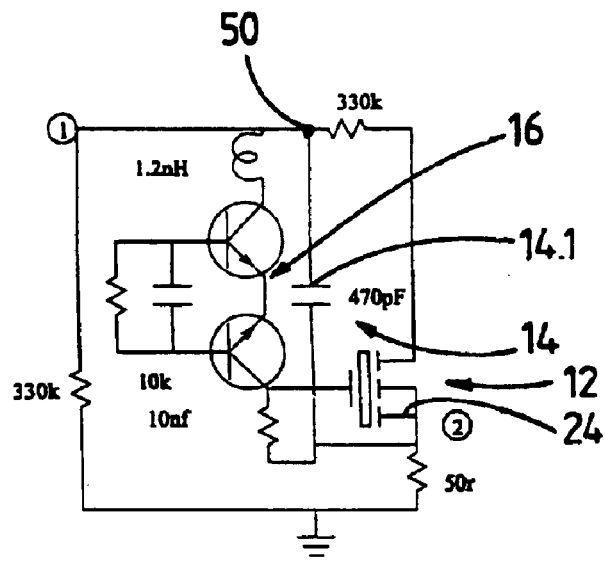
FIG. 5 is a diagram of another embodiment of the circuit according to the invention.

In FIG. 5, an alternative and self-oscillating triggering circuit for the MOSFET 12 is shown. Components thereof corresponding to components of the circuits in FIGS. 1 and 2 are designated utilizing like reference numerals. In this embodiment, the fast switching means 16 comprises a bipolar transistor arrangement.

Figure 6:
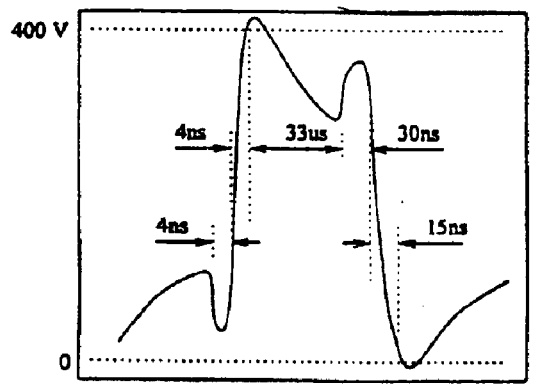
FIG. 6 is a waveform of voltage against time at a first terminal of a charge storage capacitor in FIG. 5.
Figure 7:
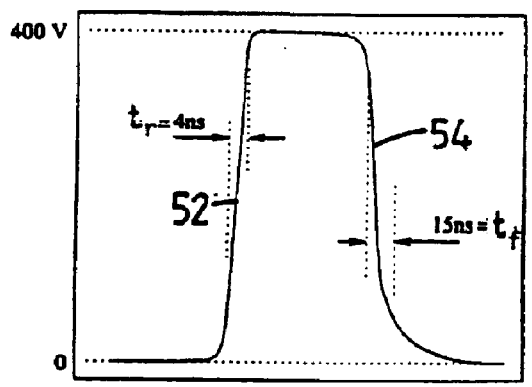
FIG. 7 is a waveform of voltage against time at the source of the MOSFET in FIG. 5.

The voltage waveform at 50 is shown in FIG. 6. The voltage waveform at source 24 is shown in FIG. 7. From the latter waveform it can be seen at 52 that the source 24 of the aforementioned MOSFET 12 switches between an "off"-state to an "on"-state through about 400V in a rise time $t_r$ of about 4 ns, which is substantially quicker than the specified rise time of 27 ns. Similarly, and as shown at 54 it switches from the "on"-state to the "off"-state in a fall time $t_f$ of about 15 ns, which is also substantially shorter than a specified fall time of about 24 ns.

Figure 8:
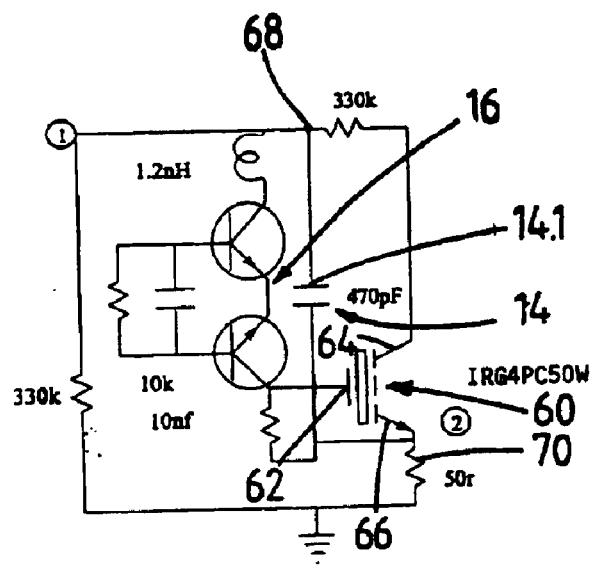
FIG. 8 is a diagram of a triggering circuit for an insulated gate bipolar transistor.
Figure 9:
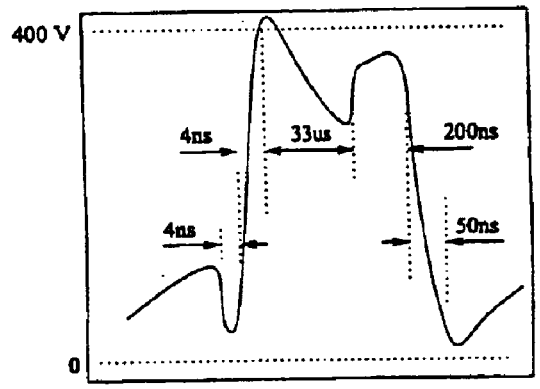
FIG. 9 is a waveform of voltage against time at a first terminal of a charge storage capacitor in the circuit in FIG. 8.
Figure 10:
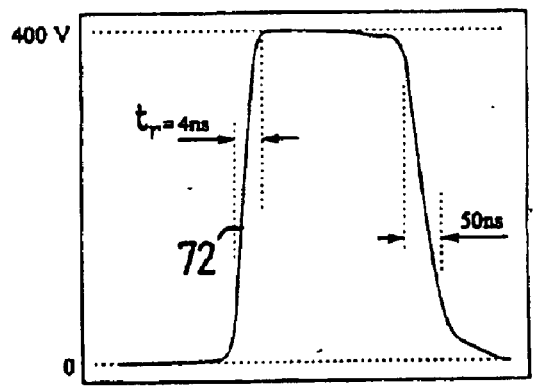
FIG. 10 is a waveform of voltage against time at an emitter of the transistor in FIG. 8.

In FIG. 8, the same triggering circuit 10 is shown for an insulated gate bipolar transistor 60 having a gate 62, a collector 64 and an emitter 66. The transistor is an IRG4PC50W device which is being manufactured and sold by International Rectifier. The waveform at 68 in FIG. 8 is shown in FIG. 9 and the waveform at emitter 66 adjacent load 70 is shown in FIG. 10.

From the latter waveform it can be seen at 72 that the emitter 66 switches between an "off"-state and an "on"-state through about 400V in a rise time $t_r$ of about 4 ns, which is substantially less than a specified rise time of 33 ns.

Figure 11:
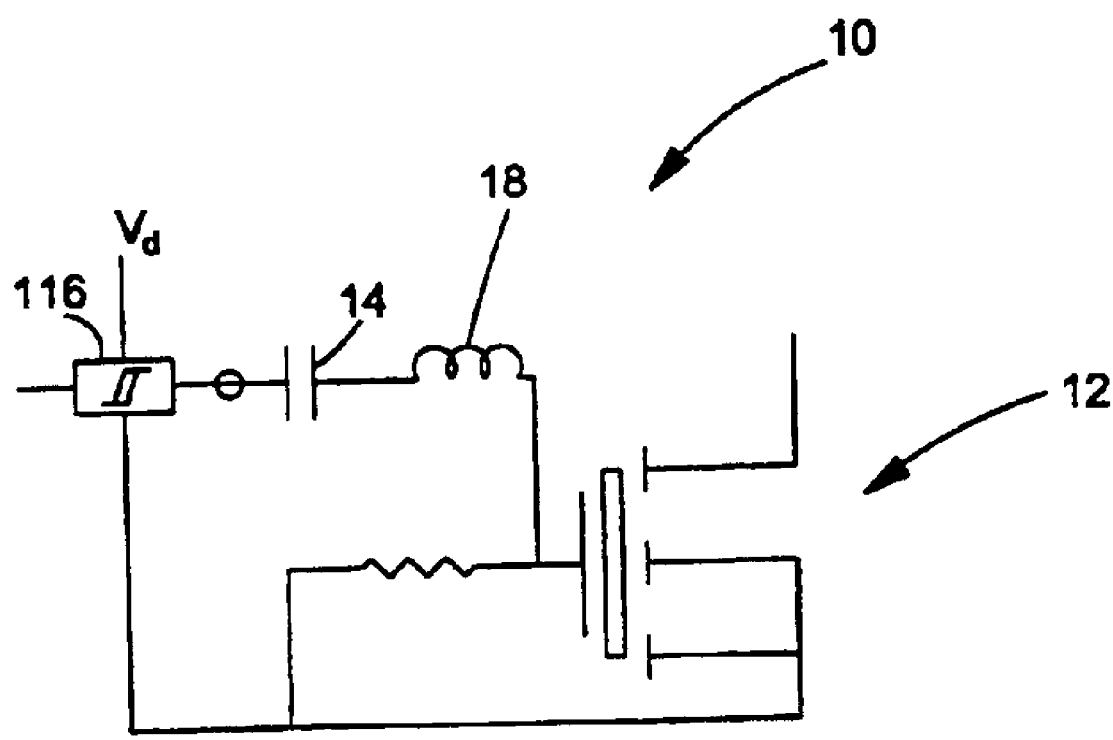
FIG. 11 is a basic circuit diagram of yet another embodiment of the triggering circuit.

In FIG. 11 a further embodiment of the triggering circuit is shown. The switching means comprises a low output impedance, high voltage, fast switching driving circuit 116.

The device 116 must be able to switch between 0V and Vd in a first time period shorter than a specified turn-on delay time of the device 12. Vd is typically bigger than 20×Vt. Devices of this nature are available on the market.

Figure 12:
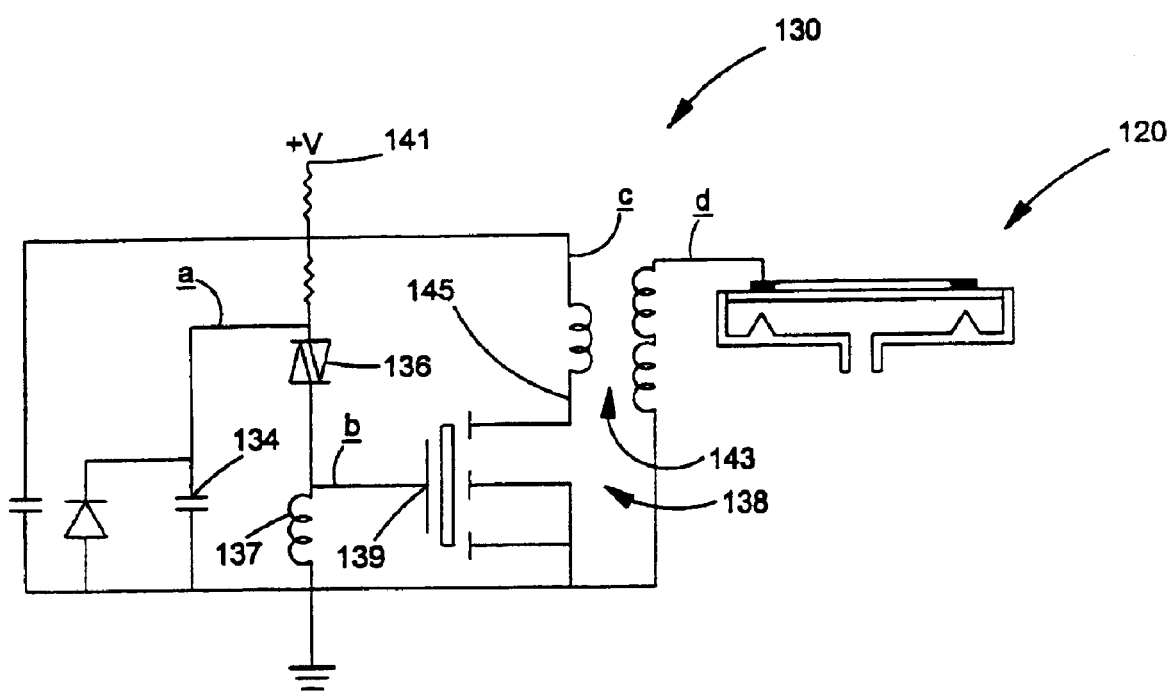
FIG. 12 is a schematic diagram of yet another embodiment of the drive or triggering circuit for driving a MOSFET which in turn is connected to drive an electrode assembly.
Figure 13A:
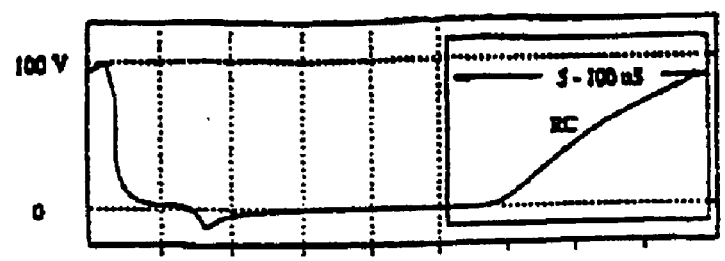
FIGS. 13(a);(b);(c) and (d) are voltage waveforms against a first time scale at points a, b, c, and d in FIG. 12.
Figure 13B:
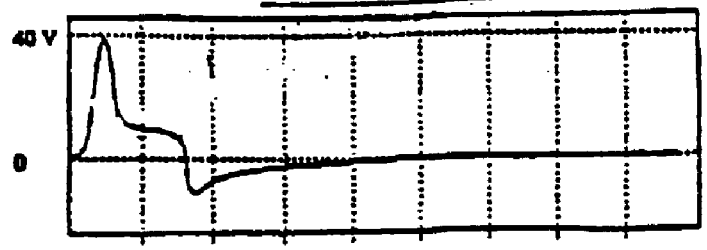
Figure 13C:
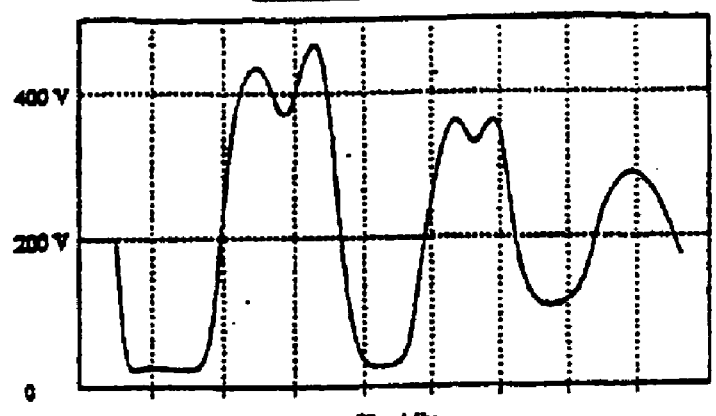
Figure 13D:
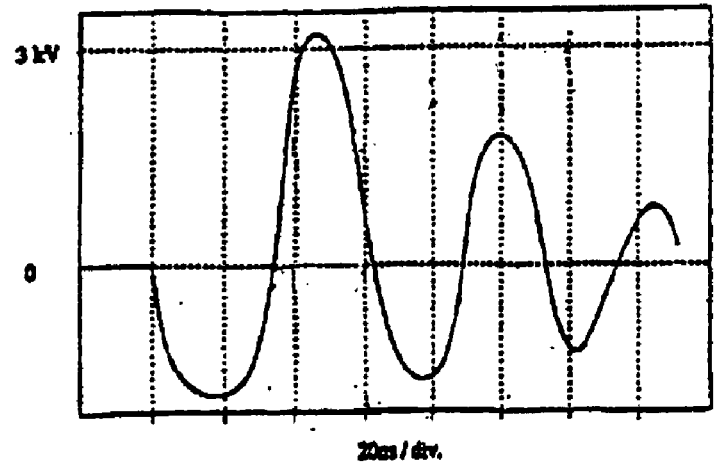
Figure 14A:
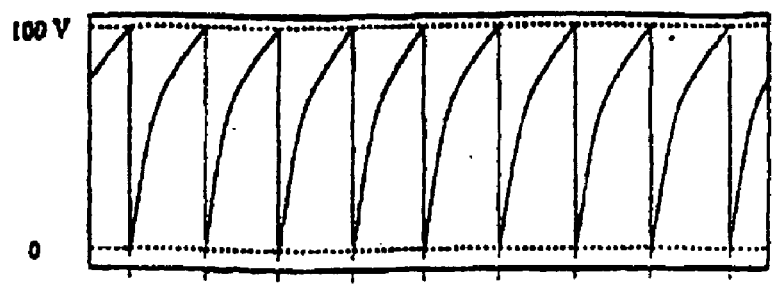
FIGS. 14(a);(b);(c) and (d) are the same wave forms against a larger time scale.
Figure 14B:
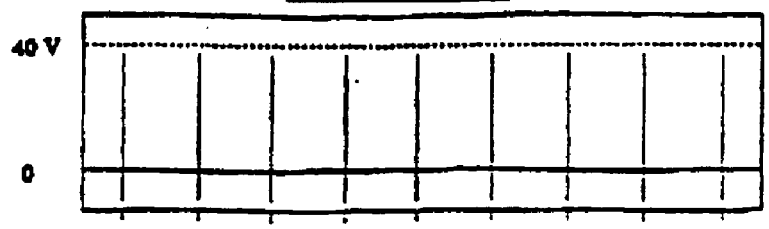
Figure 14C:
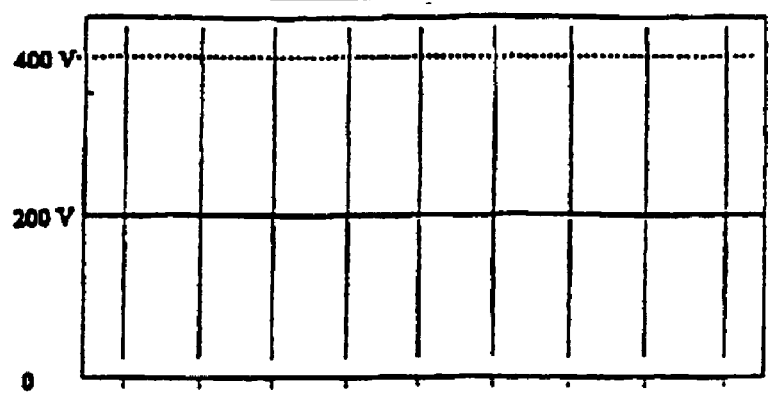
Figure 14D:
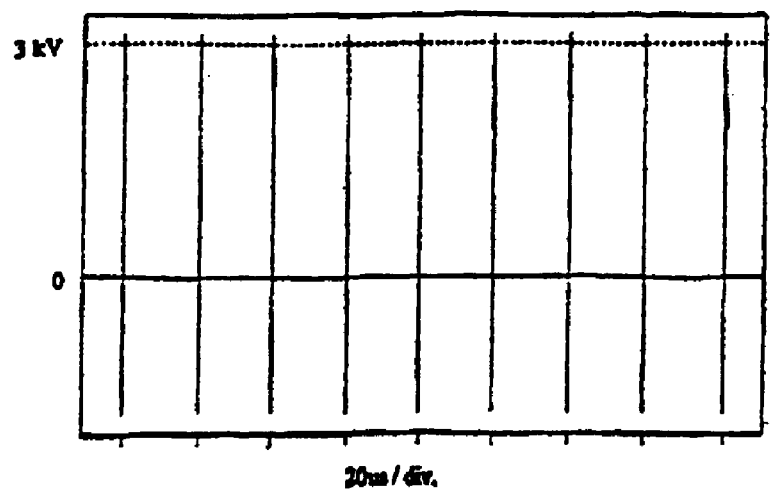

A further embodiment of a self-oscillating circuit 130 for energizing an electrode assembly 120 is shown in FIG. 12. Voltage waveforms as measured at points a, b, c and d are shown in FIGS. 13(*a*), (*b*), (*c*) and (*d*) respectively and also in FIGS. 14(*a*), (*b*), (*c*) and (*d*) respectively.

The circuit 130 comprises a capacitor 134 in parallel with a SIDAC 136 and inductor 137. The SIDAC is connected to the gate 139 of a field effect transistor (FET) such as a MOSFET 138 of the type IRF 740, for example. The SIDAC 136 conducts current when a voltage exceeding a certain threshold (100V for example) is applied across it. A primary winding of a transformer 143 is connected in series with the drain-source circuit 145 of the MOSFET 138. The secondary winding of the transformer is connected to the electrode assembly 120 as shown in FIG. 12.

A DC voltage of about 150V is applied at point 141 of the circuit. Initially the potential difference across the SIDAC 136 is insufficient to cause the SIDAC 136 to switch on and hence the capacitor 134 is charged up. When the voltage over the SIDAC 136 exceeds the aforementioned threshold voltage of the SIDAC 136, it switches on, resulting in a closed circuit from the capacitor 134 to the gate 139 of the MOSFET 138, partially discharging the capacitor 314 and hence charging the gate 139. The result is that a charge will now be shared between the capacitor 134 and the gate 139, so that some voltage, preferably sufficiently above the gate threshold voltage (typically 6V) relative to ground, is applied to the gate. The current that discharges from the capacitor 134 through the SIDAC 136 is applied to the gate 139 of the MOSFET 138 slightly prior to the onset of current flow in the drain-source circuit 145. As a result of the current from the capacitor, the voltage on the gate exceeds the aforementioned threshold voltage by a sufficient amount. The resulting signals at points a, b, c and d are shown in FIGS. 13(*a*) to (*d*) respectively and in FIGS. 14(*a*) to (*d*), respectively.

Using this method, the gate voltage may for short intervals be driven approximately two to four times beyond the maximum gate-to-source DC voltage rating of some MOSFET's without destroying the device.

It will be appreciated that there are many variations in detail on the triggering circuit and method according to the invention, without departing from the scope and spirit of the appended claims.

What is claimed is:

1. A method of driving an insulated gate semiconductor device comprising as a first terminal a gate and further comprising at least second and third terminals, wherein a charge storage device and a switching device are connected in a circuit to the gate of the semiconductor device to apply a charge pulse to the gate of the semiconductor device so as to switch the semiconductor device between one of an on state and an off state and the other of the on state and the off state, the duration of the pulse being such that the pulse is substantially complete prior to switching of the semiconductor device.

2. A method according to claim 1 wherein the insulated gate semiconductor device is a metal oxide semiconductor field effect transistor (MOSFET).

3. A method according to claim 2 wherein the MOSFET is a power MOSFET.

4. A method according to claim 1 wherein the insulated gate semiconductor device is an insulated gate bipolar transistor.

5. A method according to claim 1 wherein the charge pulse raises the gate voltage of the insulated gate semiconductor device beyond a maximum rating of the semiconductor device.

6. A method according to claim 1 wherein the switching device is connected between the charge storage device and the gate of the semiconductor device.

7. A method according to claim 1 wherein the charge storage device is connected in parallel with the switching device and the insulated gate semiconductor device.

8. A method according to claim 1 wherein the charge storage device is connected in series with the switching device and the insulated gate semiconductor device.

9. A method according to claim 1 wherein the switching device is a SIDAC.

10. A method according to claim 1 wherein the switching device is selected from a break-over diode, a bipolar transistor, a further insulated gate semiconductor device and a high voltage switching device.

11. A method according to claim 1 wherein electronic control means is provided for the switching device.

12. A method according to claim 1 wherein the charge storage device comprises a capacitor.

13. A method according to claim 1 wherein an inductor is provided between the switching device and the gate.

14. A method according to claim 1 wherein an inductor is connected in series with the switching device.

15. A method according to claim 1 wherein the circuit is integrated on a single chip.

16. The method of claim 5 wherein the charge pulse raises the gate voltage of the insulated gate semiconductor device two to four times beyond a maximum rating of the semiconductor device.

17. A circuit for driving an insulated gate semiconductor device comprising as a first terminal a gate and further comprising at least second and third terminals, the circuit comprising a charge storage device and a switching device connected to the gate of the semiconductor device to apply a charge pulse to the gate of the semiconductor device so as to switch the semiconductor device between one of an on state and an off state and the other of the on state and the off state, the duration of the pulse being such that the pulse is substantially complete prior to switching of the semiconductor device.

* * * * *